May 10, 1955  T. W. FLORY  2,708,117
COLLET CHUCKS
Filed Nov. 25, 1949  3 Sheets-Sheet 1

THOMAS WASS FLORY
INVENTOR
BY
ATTORNEY

THOMAS WASS FLORY
INVENTOR

United States Patent Office 2,708,117
Patented May 10, 1955

2,708,117

COLLET CHUCK

Thomas Wass Flory, Folkestone, England

Application November 25, 1949, Serial No. 129,300

8 Claims. (Cl. 279—51)

Draw-in collet chucks for lathes as used heretofore present the disadvantage that they grip only at one end, with the result that the work seldom runs true at first. It has been a necessary practice, therefore, to rotate and true the work before locking up the chuck finally, preparatory to machining. Owing to the short length of grip provided by the ordinary standard collet chuck, once the work has been trued, it cannot be released and gripped again with the certainty that it will continue to run true.

The object of the present invention is to overcome these drawbacks by the provision of an improved collet chuck which will grip a work piece in such a manner that not only will it run true without the necessity of preliminary testing before locking up, but it may be released and re-gripped with the certainty that it will remain true.

A further object is the provision of a collet chuck that will receive and grip satisfactorily a work piece which is tapered either intentionally or owing to errors in manufacture, and that will provide a better gripping and steadying effect than heretofore.

To these ends and in accordance with the present invention the improved collet chuck comprises a tubular collet body having axially spaced conical peripheral faces tapering in the same direction, said body being formed with two series of angularly spaced longitudinal slits extending from the opposite ends thereof for the greater part of its length, the slits of one series alternating with those of the other series, a collet housing formed with conical portions corresponding inversely with the faces on the collet body, the collet body and the collet housing being movable relatively to one another in the axial direction to actuate the collet, and having means for retaining them in their relative positions.

The collet housing may comprise two parts movable axially relatively to one another and each having a conical portion corresponding inversely with one of the conical faces on the collet body, an abutment which is fixed relatively to the first of said parts, and resilient means interposed between the second part and the abutment, the arrangement being such that, during relative axial movement of the collet body and collet housing for actuation of the collet, the second part of the collet housing engages its associated face on the collet body in advance of the engagement of the first part with its associated face. Alternatively, the housing may itself constitute a spring.

The resilient means may be constituted by a compression spring, or by a block of deformable material such as rubber.

To facilitate disengagement when the collet is released, spring or like means may be provided to separate the parts of the collet housing from their associated faces on the collet body.

The collet body may be formed with a V-threaded extension arranged to be engaged by a correspondingly V-threaded member for axial movement of the collet body, the threaded extension being split into fingers by the slits of one of said series of slits, the arrangement being such that when tension is exerted by the threaded member on the collet body the engagement of the threads of the body by the threads of the threaded member causes the fingers of the extension to be moved substantially radially and the grip of the adjacent part of the collet body on a work piece to be augmented.

Embodiments of the invention will be described with reference to the accompanying drawings, in which.

Figure 1:
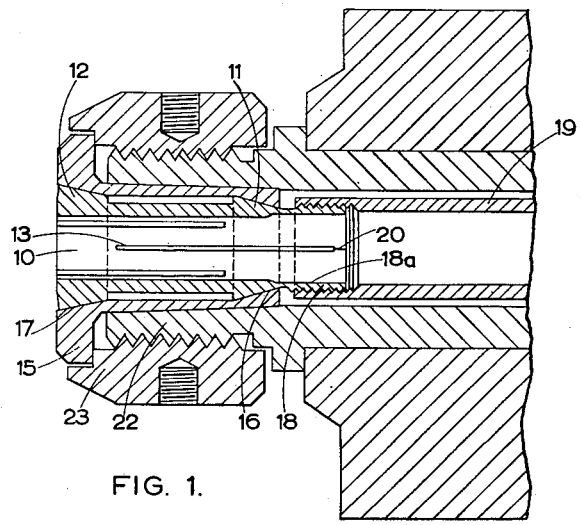
Figure 1 is a longitudinal sectional elevation of a collet chuck assembled.
Figure 2:
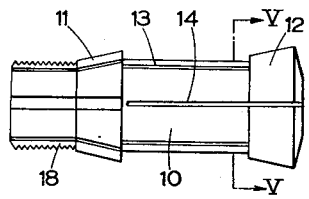
Figure 2 is a side elevation of the collet body.
Figures 3, 4:
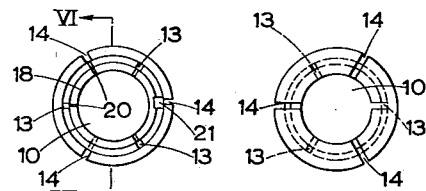
Figure 3 is an end elevation thereof, viewed from the left of Figure 2.
Figure 4 is an end elevation thereof, viewed from the right of Figure 2.
Figure 5:
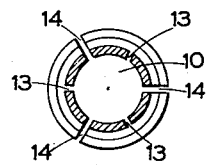
Figure 5 is a cross-section thereof, on the line V—V, Figure 2.
Figure 6:
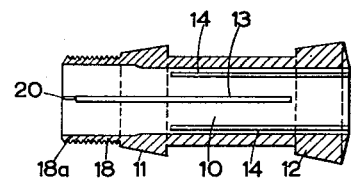
Figure 6 is a longitudinal sectional elevation thereof, on the line VI—VI, Figure 3.

Referring to Figures 1 to 6, the collet body 10 has externally, and at or near its opposite ends, conical enlargements forming faces 11, 12. For practical purposes the greatest diameter of the conical enlargement 11 is less than the smallest diameter of the enlargement 12. The body 10 is formed with longitudinal slits 13, 14 extending from opposite ends thereof for the greater part of its length and being angularly spaced, the slits 13 extending from the end near the face 11 and alternating with the slits 14 extending from the other end, while the body 10 as a whole is received in a housing 15 having internal angular seatings 16, 17 corresponding with the conical faces 11, 12 of the collet body 10. The collet body 10 is formed with an externally V-threaded tubular extension 18 adjacent to the smaller conical face 11. This tubular extension is formed with slits which are continuations of the slits 13.

A recess in the end of a pull tube 19 is V-threaded for engagement with the tubular extension 18 and in order to prevent the extension 18 from effecting any grip on the work its bore is preferably somewhat greater than that of the collet body 10, as shown at 18a. When tension is applied to the collet body 10 through the operation of the pull tube 19, the intersection of the V-threads on the tubular extension 18 and the pull tube 19 assists the closing of the adjacent conical portion 11 of the collet body 10 and augments its grip on the work piece. In order to prevent the permanent collapse and distortion of the threaded end of the tubular extension 18 through this intersection, the width of the slits 13 is decreased as at 20. The reduced width of the slits 20 also serves to prevent damage to, or stripping of, the thread through excessive constriction of the threaded extension 18 in a radial direction when the pull tube 19 is in action. With the object of securing these conditions it is essential that the threaded end of the tubular extension 18 and the internal thread in the pull tube 19 should be a good fit before the slits 13 and 20 are cut.

In an alternative arrangement, instead of being in one piece, the pull tube may be provided with a jointed link (not shown) threaded to engage the threaded extension 18, so compensating for any misalignment. Such a link may be arranged at the end remote from its threaded end, to be coupled to a standard pull tube. The collet body 10 is provided with a keyway 21 to engage a key or feather (not shown) in the collet housing 15 to secure the collet against retrograde action whilst in use.

In producing the collet chuck it is desirable to ensure, before the slits 13, 14 are formed, that the conical faces 11, 12 on the collet body 10 fit accurately in the seatings 16, 17 in the housing 15 and that both enlargements make contact with their respective seatings at exactly the same time, after which the slits 13, 14 may be cut.

It is to be understood that although a single housing may serve to provide seatings for a series of collet bodies 10 the bore of a collet body must be appropriate to the diameter of the work which it is to grip, and preferably the diameter of the bore is about two thousandths of an inch greater than the diameter of the work.

After a parallel work piece has been introduced into the collet body 10, the collet is drawn by means of the pull tube 19 into the collet housing 15, the two seatings 16, 17 of which are contacted simultaneously by the two conical faces 11, 12 of the collet body 10, causing the latter to close equally and axially throughout its entire length, true axial alignment being guaranteed by the external surface of the collet housing 15, which is ground to match the taper of the lathe mandrel 22. The lathe spindle nose cap 23 serves the dual purpose of protecting cap and collet housing withdrawal nut.

If the part of the work piece which is to be gripped by the collet chuck is tapered more than a few thousandths of an inch, the bore of the collet body must be tapered correspondingly.

In practice, when using single cone collets of normal type, difficulties are often encountered in maintaining true axial alignment during rough turning, especially when the gripped surface of the work piece is slightly tapered in either direction and almost invariably whenever it is necessary to release and re-grip the work piece in the collet. These difficulties are overcome by the use of double-ended collets of the type herein described.

Figure 7:
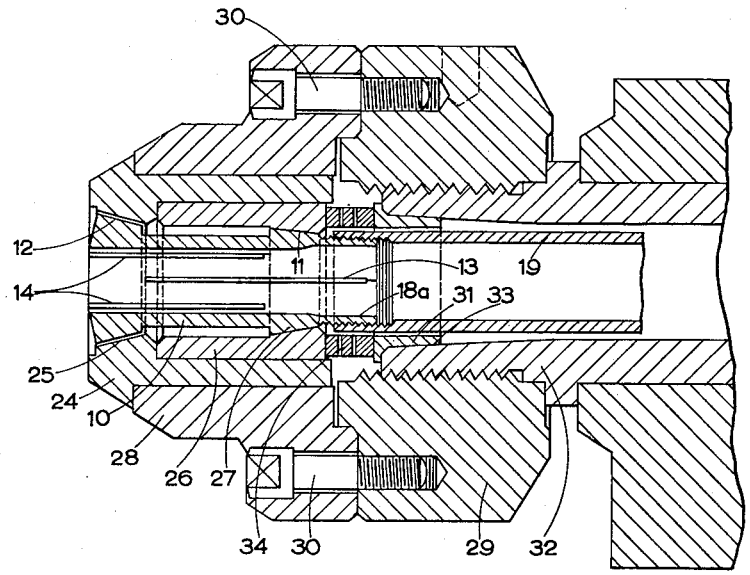
Figure 7 is a longitudinal sectional elevation of another embodiment.

Figure 7 illustrates an embodiment in which the collet housing can be mounted with equal accuracy, and perhaps more rigidity, directly upon the lathe manual register by means of the lathe spindle screw.

In this arrangement the collet body 10 is held in a collet housing comprising an outer member 24 having a seating 25 engageable with the conical face 12 and an inner member 26 having a seating 27 engageable with the conical face 11 and slidable within the outer member 24. The outer member 24 is received in a main housing 28, which is coupled to a collet housing adaptor 29 by means of four retaining bolts 30, which draw the main housing 28 firmly on to the adaptor register at 31, the adaptor 29 having been accurately machined after mounting in position on the lathe mandrel register 32.

Within the lathe mandrel and a tapered fit therein is an abutment 33, and between this abutment and the inner member 26 is a compression spring 34 (which may alternatively be a block of deformable material such as rubber) which urges the inner member 26 forward so that its seating 27 is in contact with the conical face 11 of the collet body 10. In this position (as shown in Figure 7) the conical face 12 of the collet body 10 has not yet contacted the seating 25 of the outer member 24, the axial distance between the seatings 25, 27 being arranged to be less than that between the faces 11, 12.

When the work piece has been introduced into the collet body 10, the pull tube 19 is tightened as before, drawing the collet body 10 into the housing. After considerable pressure, induced by the spring 34, has built up on the work piece, the rear seating 27 while being held axially true by the outer member 24, creeps backwards slightly under the tension from the pull rod 19, allowing the front conical face 12 of the collet body 10 to be drawn firmly into contact with the seating 25 of the outer member 24.

Thus the collet always remains perfectly true in action when the workpiece is slightly tapered, and the grip on the workpiece is assured over a considerable length, the main locking action being secured at the front where it is most needed, while the rear cone of the collet acts as a resilient steady which ensures absolute recovery from tool shock. Resilient means may be interposed between the inner member 26 and the portion of the collet body 10 formed with the face 12 to urge the collet faces away from their associated faces on the collet housing and facilitating the disengagement when the collet is released.

Figure 8:
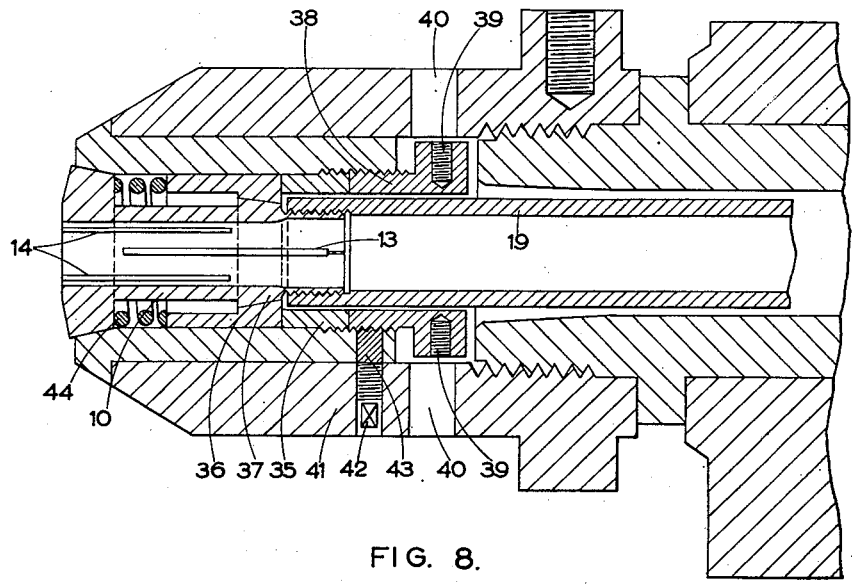
Figure 8 is a longitudinal sectional elevation of yet a further embodiment.

The gripping power of this new collet chuck can be controlled and rendered more effective by means of the device illustrated in Figure 8.

The compression unit is in this case a beryllium-copper collar 35 which rests against a rear sliding member 36, the position of the collar 35 and thus of the collet rear seating 37 being controlled by a rear seating adjusting nut 38, formed with tommy bar holes 39 accessible from without through slots 40 formed in the outer housing 41. Thus a perfect balance of pressure throughout the collet bore can be induced on any given workpiece and the chuck can quickly be set for repetition work on components having a slight taper of a known degree, in either direction, the adjusting nut 38 being locked in the required position by a locking screw 42 which compresses an adjusting nut locking screw pad 43, against the nut thread. A collet release spring 44 is provided to facilitate the repeated operation of the collet.

Instead of the locking screw 42 and pad 43, the adjusting nut 38 may be made oversize and split axially, so as to lock in any position.

Figure 9:
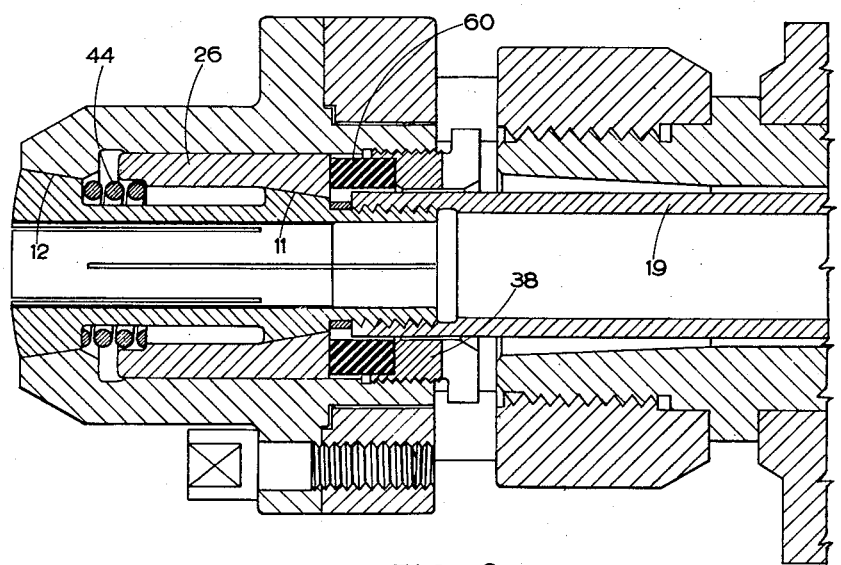
Figure 9 is a longitudinal sectional elevation of yet another embodiment.

Figure 9 shows a modification in which an annular rubber block 60 is used in place of the spring 34 in Figure 7. The sliding member 26 in this case is retained between the block 60 and a compression spring 44 and the block is retained between the member 26 and an adjusting nut 38. When the collet is closed on the workpiece by pulling the pull rod 19 to the right, as before, after considerable pressure due to the reaction of the rubber block 60 has built up on the workpiece, the seating for the rear conical face 11 of the collet body 10 creeps backwards slightly under the tension from the pull rod 19, allowing the front conical face 12 of the collet body 10 to be drawn firmly into contact with the front seating.

It has been found by actual performance that the improved collet chuck will remain true much longer than the ordinary standard single ended design, and can be depended upon absolutely to hold the work with accuracy even if the work be released and regripped.

It is also to be understood that if the work piece is tubular or is formed with a suitable aperture the collet body may be made expansible instead of contractable, the collet body being disposed outside the member heretofore termed the collet housing and being formed with internal conical projections, while the collet housing has external conical portions.

I claim:

1. A collet chuck comprising a tubular collet body having axially spaced conical enlargements formed with peripheral faces tapering in the same direction, said body being formed with two series of angularly spaced longitudinal slits extending from the opposite ends of said body for the greater part of its length, the slits of one series being interdigitated with those of the other series a collet housing comprising a first and second part movable axially relatively to one another and each having a conical portion corresponding inversely with the face of an associated conical enlargement on said collet body, an abutment fixed relatively to said first part, and resilient means interposed between said second part and said abutment, said collet body and collet housing being movable relatively to one another in the axial direction and actuating the collet, and having adjustable means retaining them in their relative positions, said second part, during relative axial movement of the collet body and collet housing for actuation of the collet engaging its associated face on said collet body in advance of the engagement of said first part with its associated face.

2. A collet chuck as claimed in claim 1, wherein resilient means are provided urging the collet faces away from their associated faces on the collet housing and facilitating disengagement when the collet is released.

3. A collet chuck as claimed in claim 1, wherein the resilient means interposed between said second part and said abutment are constituted by a compression spring.

4. A collet chuck as claimed in claim 1, wherein the resilient means interposed between said second part and said abutment are constituted by a block of deformable material such as rubber.

5. A collet chuck as claimed in claim 1, wherein the collet body is formed with a V-threaded extension split into fingers by the slits of one of said series of slits and there is provided a correspondingly V-threaded member adapted to engage said extension and move the collet body axially, the arrangement being such that when tension is exerted by said V-threaded member on the collet body the engagement of the threads of the body by the threads of the V-threaded member causes the fingers of the extension to be moved substantially radially and the grip of the adjacent part of the collet body on a work piece to be augmented.

6. A collet chuck comprising, in combination, a tubular collet body split longitudinally by two interdigitated series of slits extending from opposite ends thereof for the greater part of its length so as to be yielding under radial stress and to permit the collet body to be resiliently expanded and contracted at each end, said body being formed in the vicinity of one end with an annular series of tapered surfaces and at the other end with a screw thread, and further formed between said surfaces and said screw thread with a second annular series of tapered surfaces, a collet engaging element unyielding under radial stress formed with engaging surfaces arranged to mate with both said annular series of surfaces, and a longitudinally movable member formed with a screw thread screwed onto said first-mentioned screwthread, the arrangement being such that when tension is applied to said member, urging said collet body to move relative to said collet engaging element so as to cause said collet body to grip the work, the radial configuration of said body is changed as a result of the reaction of said engaging surfaces on said two annular series of tapered surfaces and as a result of the interaction between the threads on said longitudinally movable member and those on said collet body, said collet body being recessed in the vicinity of said screw thread so as at all times to clear the work in said vicinity.

7. A collet chuck comprising, in combination, a tubular collet body split longitudinally by two interdigitated series of slits extending from opposite ends thereof for the greater part of its length so as to be yielding under radial stress and to permit the collet body to be resiliently expanded and contracted at each end, said body being formed with two spaced annular series of tapered surfaces with the wider end of one series facing the narrower end of the other series, a collet engaging element unyielding under radial stress and formed with an engaging surface arranged to mate with one of said annular series of tapered surfaces, a second collet engaging element unyielding under radial stress and longitudinally adjustable with respect to said first-mentioned collet engaging element and formed with an engaging surface arranged to mate with the second of said annular series of tapered surfaces, means separate from said collet body for arresting relative longitudinal movement between said two collet engaging elements, a spring operative yieldingly to hold one of said collet engaging elements in contact with said means for arresting the relative longitudinal movement, and means separate from said two collet engaging elements for urging said collet body relatively to said two collet engaging elements so as to cause the radial configuration of said collet body to be changed.

8. A collet chuck according to claim 7, wherein said means for arresting relative longitudinal movement between said two collet engaging elements comprises a spring arranged to urge the second of said collet engaging elements in a direction the same as that in which said collet body is moved to mate with said two collet engaging elements, and further comprises an abutment against which said second element is urged, said abutment being manually adjustable in position.

References Cited in the file of this patent

UNITED STATES PATENTS

| | | |
|---|---|---|
| 579,265 | Gulick | Mar. 23, 1897 |
| 1,185,762 | Bohlig | June 6, 1916 |
| 2,193,890 | Strobl | Mar. 19, 1940 |
| 2,278,267 | Holmes | Mar. 31, 1942 |
| 2,345,069 | Phillips | Mar. 28, 1944 |
| 2,360,908 | Stoner | Oct. 24, 1944 |
| 2,363,411 | Goodwin | Nov. 21, 1944 |
| 2,363,721 | Evans | Nov. 28, 1944 |
| 2,436,848 | Benjamin et al. | Mar. 2, 1948 |

FOREIGN PATENTS

| | | |
|---|---|---|
| 674,050 | Great Britain | 1952 |
| 279,981 | Switzerland | 1952 |